United States Patent
Scott

[15] 3,672,400
[45] June 27, 1972

[54] PNEUMATICALLY OPERATED VALVE MEANS AND FUEL CONTROL SYSTEM UTILIZING THE SAME

[72] Inventor: Douglas R. Scott, Elkhart, Ind.
[73] Assignee: Robertshaw Controls Company, Richmond, Va.
[22] Filed: July 27, 1970
[21] Appl. No.: 58,284

[52] U.S. Cl. ................................. 137/630.22, 137/614.11
[51] Int. Cl. .......................................................... F16k 31/12
[58] Field of Search ................. 137/630.19, 630.22, 614.11; 251/122

[56] References Cited

UNITED STATES PATENTS

| | | |
|---|---|---|
| 1,254,599 | 1/1918 | Irwin .................................... 251/122 X |
| 3,201,937 | 8/1965 | McKee .................................. 251/122 X |
| 3,048,274 | 8/1962 | Lundeen ............................... 251/122 X |
| 2,183,825 | 12/1939 | Steffen ................................. 137/614.11 |
| 608,342 | 8/1898 | McElroy .................................. 251/122 |
| 2,610,063 | 9/1952 | Faucheux ............................ 137/614.11 |
| 3,236,261 | 2/1966 | Morgan ............................. 137/630.22 X |

Primary Examiner—Robert G. Nilson
Attorney—Auzville Jackson, Jr., Robert L. Marben and Candor, Candor & Tassone

[57] ABSTRACT

A pneumatically operated valve means having a housing means provided with an inlet separated from an outlet by a valve seat, the outlet having an orifice through which the entire fuel flow from the inlet must pass when the valve seat is open. A pneumatically operated valve member is carried by the housing for opening and closing the valve seat. A metering pin has one end cooperating with the orifice for controlling fuel flow therethrough and is operatively interconnected to the valve member to be moved thereby for providing different levels of fuel flow through the housing.

18 Claims, 5 Drawing Figures

INVENTOR.
DOUGLAS R. SCOTT

PNEUMATICALLY OPERATED VALVE MEANS AND FUEL CONTROL SYSTEM UTILIZING THE SAME

This invention is related to the pneumatic control system and pneumatically operated valve means respectively set forth in the copending patent applications, Ser. No. 5,709, filed Jan. 26, 1970, and Ser. No. 823,589, filed May 12, 1969 U.S., now Pat. No. 3,592,232, which are assigned to the same assignee to whom this application is assigned.

It is well known from the aforementioned patent application that a fuel burning apparatus, such as a clothes dryer or the like, can be provided wherein the flow of fuel to the main burner means thereof is controlled by a pneumatic control system wherein pneumatically operated valve means must receive a pneumatic signal in order to interconnect a fuel source with the main burner means.

It is a feature of this invention to provide an improved pneumatically operated valve means for such a fuel control system or the like.

In particular, one embodiment of this invention provides a housing means having an inlet separated from an outlet by a valve seat. The outlet has an orifice through which the entire fuel flow from the inlet must pass to the main burner means when the valve seat is opened. A pneumatically operated valve member is carried by the housing means for opening and closing the valve seat. A metering pin has one end cooperating with the orifice for controlling fuel flow therethrough and is operatively interconnected to the valve member by lost motion means whereby when the valve member is moved to a certain open position thereof, the metering pin remains in a normal position relative to the orifice for one level or rate of fuel flow to main burner means. However, further movement of the valve member to another open position thereof causes the lost motion means to be taken up and move the metering pin to a new operating position thereof to provide a greater flow rate to the main burner means.

Accordingly, it is an object of this invention to provide an improved pneumatically operated valve means for a fuel burning apparatus or the like, the pneumatically operated valve means of this invention having one or more of the novel features set forth above or hereinafter shown or described Another object of this invention is to provide an improved fuel control system utilizing such a pneumatically operated valve means.

Other objects, uses and advantages of this invention are apparent from a reading of this description which proceeds with reference to the accompanying drawing forming a part thereof and wherein:

While the various features of this invention are hereinafter described and illustrated as being particularly adapted to pneumatically control the operation of a domestic clothes dryer or the like, it is to be understood that the various features of this invention can be utilized singly or in any combination thereof to provide control means for other types of apparatus as desired.

Therefore, this invention is not to be limited to only the embodiments illustrated in the drawings, because the drawings are merely utilized to illustrate one of the wide variety of uses of this invention.

In order to fully understand the operation and utility of the pneumatically operated valve means of this invention, the entire fuel control system utilizing such a pneumatically operated valve means will first be described.

Figure 1:
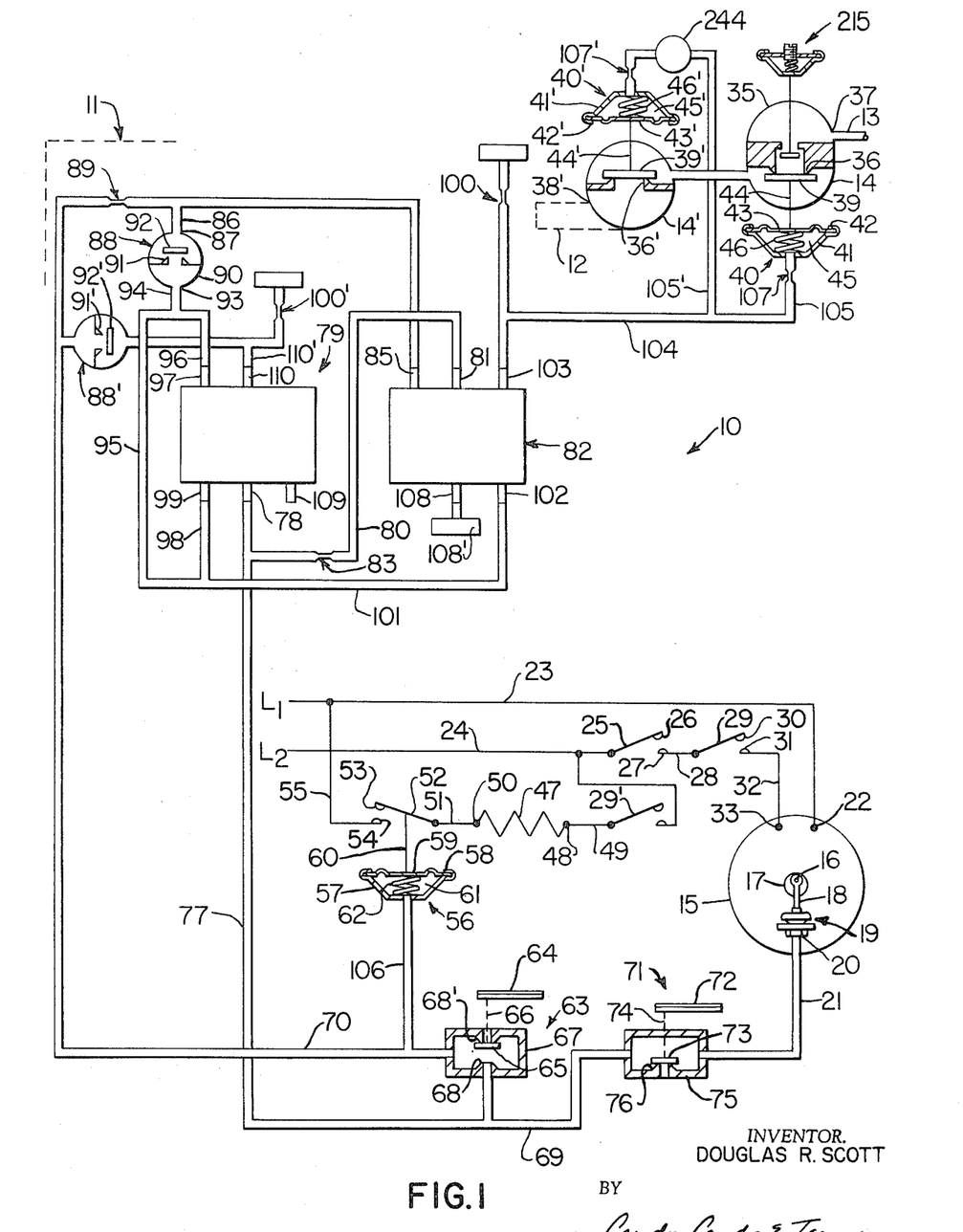
FIG. 1 is a schematic view illustrating the improved control system of this invention.

Referring now to FIG. 1, the improved control system of this invention is generally indicated by the reference numeral 10 and is utilized for controlling the operation of a clothes dryer, generally indicated by the reference numeral 11, having a main burner means 12 adapted to be interconnected to a fuel source manifold 13 by a pair of pneumatically operated valve means 14 and 14' in a manner hereinafter described.

The apparatus 11 includes an electric motor 15 which rotates the clothes-receiving drum (not shown) of the apparatus 11 during the entire cycle of operation of the apparatus 11 in a conventional manner, the electric motor 15 being adapted to be interconnected across two power source leads $L^1$ and $L^2$ in a manner hereinafter described.

The electric motor 15 is adapted to drive an eccentric cam 16 that is interconnected to its output shaft 17 as long as the electric motor 15 is energized whereby the eccentric cam 16 will continuously move a piston rod arrangement 18 to operate a vacuum pump means 19 so as to provide a continuous vacuum source for the system 10 of this invention as long as the electric motor 15 is energized, the vacuum pump means 19 having its inlet 20 interconnected to a conduit means 21.

The power source lead $L^1$ is interconnected to one side 22 of the electric motor 15 by a lead 23. The other power source lead $L^2$ is interconnected by a lead 24 to a conventional timer operated switch blade 25 that has its contact 26 cooperable with a fixed contact 27 that is interconnected by a lead 28 to a dryer door operated switch blade 29. The dryer door operated switch blade 29 has a contact 30 cooperable with a contact 31 that is interconnected by a lead 32 to the other side 33 of the electric motor 15.

Therefore, it can be seen that in order for the electric motor 15 to be placed across the power source leads $L^1$ and $L^2$ for the electric motor 15 to be energized, not only must the dryer door be disposed in its closed position to close and hold the switch blade 29 against the contact 31, but also the housewife or the like must manually set the cycle timer means (not shown) of the control system 10 so that the same is in an on condition to hold the switch blade 25 against the contact 27 for a preset time period after the lapse of which the timer cycle means will automatically open the switch blade 25 away from the contact 27 to terminate the operation of the control system 10 in a conventional manner.

The pneumatically operated valve means 14 and 14' for interconnecting the fuel source conduit 13 to the main burner means 12 of the apparatus 11 are substantially identical in construction and operation and while one such valve means could properly control the on-off condition of the main burner means 12, the use of two such valve means merely provides a safety factor so that if one of the valve means fails, the other valve means will still perform its function.

Figure 2:
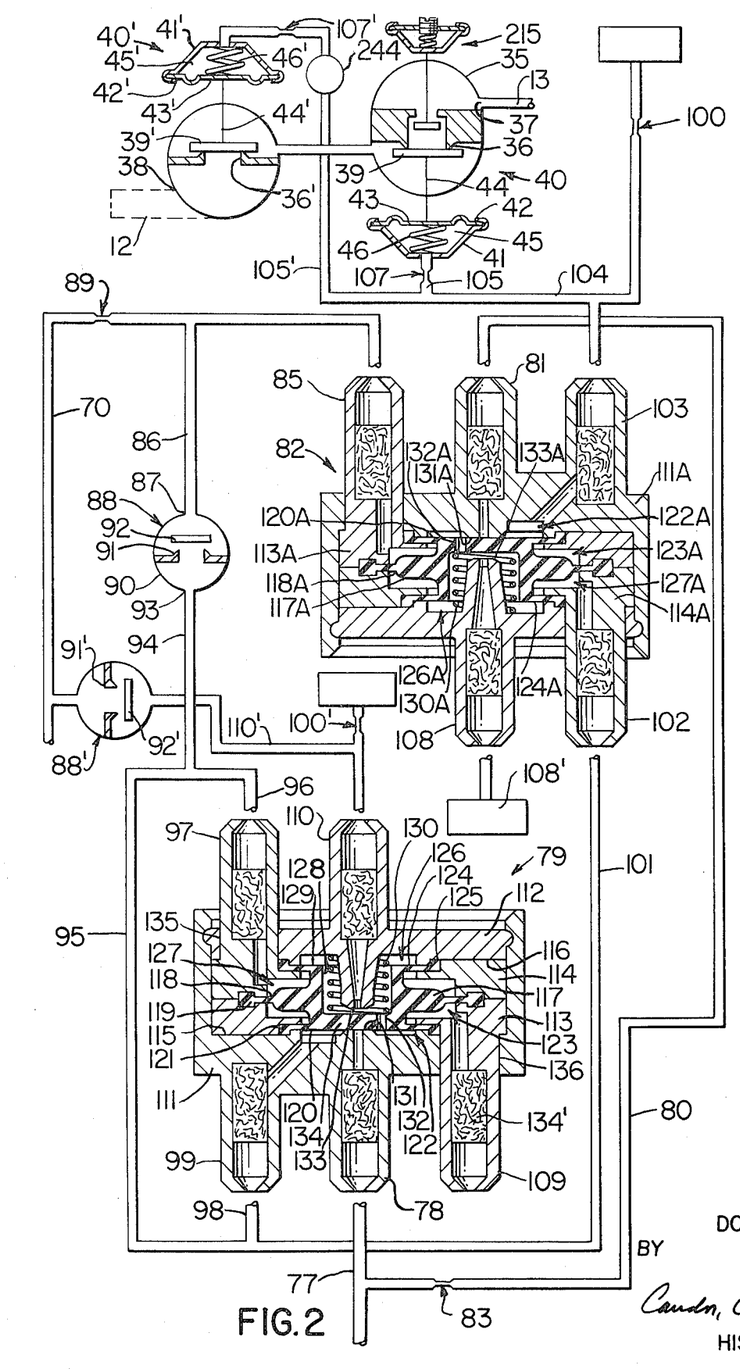
FIG. 2 is an enlarged, fragmentary view of the pneumatically operated logic units of the control system of FIG. 1 with the logic units being illustrated in cross section.

As illustrated in FIG. 1, the pneumatically operated valve means 14 and 14' comprise a housing means 35 having valve seats 36 and 36' that interconnect a fuel source inlet 37 to a fuel source outlet 38, the valve seats 36 and 36' being opened and closed by valve members 39 and 39' that are moved between their opened and closed positions by vacuum operated actuators that are generally indicated by the reference numerals 40 and 40'. The vacuum operated actuators 40 and 40' are schematically illustrated in FIGS. 1 and 2 and thereby comprise cup-shaped housing members 41 and 41' having their open ends 42 and 42' closed by flexible diaphragms 43 and 43' that are interconnected to the valve members 39 and 39' by tying means 44 and 44' in a conventional manner whereby the flexible diaphragms 43 and 43' cooperate with the housings 41 and 41' to define chambers 45 and 45' therebetween. Compression springs 46 and 46' are disposed in the chambers 45 and 45' to tend to normally move the flexible diaphragms 43 and 43' in directions to maintain the valve members 39 and 39' in their closed positions against the valve seats 36 and 36' to prevent any flow of fuel to the main burner means 12. However, when the vacuum source 19 is interconnected to the chambers 45 and 45' in a manner hereinafter described to evacuate the chambers 45 and 45', the pressure differential acting across the diaphragms 43 and 43' moves the diaphragms 43 and 43' in opposition to the force of the compression springs 46 and 46' to move the valve members 39 and 39' to their open positions so that the fuel source 13 will be interconnected to the main burner means 12 as long as the pneumatically operated actuators 40 and 40' are in their actuated condition.

The ignition means for the main burner means 12 comprises an ignition coil 47 having one side 48 thereof interconnected by a lead 49 to the lead 24 through a door operated switch 29', similar to door switch 29, so that the side 48 of the ignition coil 47 is always interconnected to the power source lead L² when the dryer door is closed. The other side 50 of the ignition coil 47 is interconnected by a lead 51 to a switch blade 52 that has a contact 53 cooperable with a contact 54 that is interconnected to the power source lead L¹ by a lead 55.

A vacuum operated actuator 56 controls the switch blade 52 and comprises a cup-shaped housing 57 having its open end 58 closed by a flexible diaphragm 59 that is interconnected to the switch blade 52 by a suitable tying means 60, the flexible diaphragm 59 cooperating with the housing 57 to define a chamber 61 therebetween that receives a compression spring 62 that normally tends to urge the flexible diaphragm 59 upwardly to hold the switch blade 52 out of contact with the contact 54 and thereby maintain the ignition coil 47 in its de-energized condition. However, when the chamber 61 of the actuator 56 is interconnected to the vacuum source 19 in a manner hereinafter described, the resulting pressure differential acting across the diaphragm 59 moves the diaphragm 59 downwardly in opposition to the force of the compression spring 62 to place the switch blade 52 into contact with the contact 54 so as to place the ignition coil 47 across the power source leads L¹ and L².

When the ignition coil 47 is placed across the power source leads L¹ and L² by the vacuum operated actuator 56 in a manner hereinafter described, the ignition coil 47 subsequently heats up to a temperature that will be sufficient for igniting fuel issuing from the main burner means 12 in a conventional igniting manner.

An ignition coil temperature sensing means 63 is provided for the system 10 and comprises a bimetal member 64 that is interconnected to a valve member 65 by a typing means 66, the valve member 65 being disposed in a housing means 67 having a valve seat 68 fluidly interconnecting a conduit 69 to a conduit 70. When the bimetal member 64 senses a temperature of the ignition coil 47 below a temperature sufficient for igniting fuel issuing from the main burner means 12, the bimetal member 64 is in such a condition that the same maintains the valve member 65 away from the valve seat 68 and against a valve seat 68' that leads to the atmosphere so as to fluidly interconnect the conduits 69 and 70 together. However, when the ignition coil 47 reaches an ignition temperature, the bimetal member 64 warps in such a manner that the same moves the valve member 65 against the valve seat 68 to terminate the fluid connection between the conduits 69 and 70 and opens the valve seat 68' so that atmosphere is interconnected to the conduit 70 for a purpose hereinafter described. In addition, when the main burner means 12 is operating, the bimetal member 64 also senses the flames at the main burner means 12 so that the bimetal member 64 will maintain the valve member 65 in its closed position against the valve seat 68 as long as fuel is burning at the main burner means 12.

Another temperature sensing device 71 is provided for the control system 10 and is adapted to sense the temperature effect of the main burner means 12. The temperature sensing means 71 comprises a bimetal member 72 that is interconnected to a valve member 73 by a tying means 74, the valve member 73 being disposed in a housing means 75 to open and close a valve seat 76 thereof that is adapted to fluidly interconnect the atmosphere with the interior of the housing 75 when the valve seat 76 is open. However, when the valve seat 76 is closed, the housing 75, in effect, interconnects the conduit 21 to the conduit 69 of the ignition temperature sensing means 63.

As long as the temperature effect of the burner means 12 of the apparatus 11 is below a predetermined temperature effect setting of the sensing means 71, the bimetal member 72 maintains the valve member 73 against the valve seat 76 to, in effect, fluidly interconnect the conduits 21 and 69 together whereby if the electric motor 15 is energized, the vacuum source 19 will be interconnected to the conduit 69. However, when the temperature sensing means 71 senses a temperature effect of the burner means 12 above the set temperature effect setting of the thermostatic means 71, the bimetal member 72 warps in a manner to move the valve member 73 away from the valve seat 76 and, thus, in effect, disconnects the vacuum source 19 from the conduit 69 as the atmosphere is now interconnected to the conduit 69 through the opened valve seat 76 for a purpose hereinafter described. Of course, it is to be understood that the sensing device 71 could be manually adjustable for temperature selection purposes by the housewife or the like or could be factory set for an optimum drying temperature for the apparatus 11.

The conduit 69 is interconnected by a conduit 77 to a port means 78 of a pneumatically operated logic "memory" unit 79 later to be described, the conduit 77 also being fluidly interconnected to a conduit 80 that leads to a port means 81 of a pneumatically operated logic "nand" unit 82 of this invention. The conduit 80 has a restriction 83 therein intermediate the port means 81 of the logic "nand" unit 82 and the conduit 77.

The conduit 70 leading from the ignition temperature sensing means 63 is interconnected to another port means 85 of the logic "nand" unit 82 as well as to a conduit 86 that is interconnected to one side 87 of a check valve 88, the conduit 70 having a restriction means 89 therein in advance of the conduit 86.

The check valve 88 comprises a housing means 90 having a valve seat 91 adapted to be opened and closed by a valve member 92, the valve seat 91 being adapted to interconnect the conduit 86 at the side 87 thereof to the other side 93 of the check valve 88 that leads to a conduit 94. The valve member 92 normally seats against the valve seat 91 to prevent fluid communication between the conduits 86 and 94 so that when the conduit 70 is interconnected to the vacuum source 19 by the valve means 63 and 71 being disposed in the positions of FIG. 1, the vacuum source 19 opens the valve member 92 away from the valve seat 91 so as to be interconnected to the conduit 94.

The conduit 94 is fluidly interconnected to a conduit 95 that has one end 96 thereof interconnected to a port means 97 of the logic "memory" unit 79 while the other end 98 of the conduit 95 is interconnected to another port means 99 of the logic "memory" unit 79.

The conduit 95 is fluidly interconnected to a conduit 101 that leads to a port means 102 of the logic "nand" unit 82, the logic "nand" unit having another port means 103 thereof fluidly interconnected to a conduit means 104 that is fluidly interconnected to branch conduit means 105 and 105' that are respectively fluidly interconnected to the chambers 45 and 45' of the vacuum actuators 40 and 40'. The branch conduits 105 and 105' respectively have restrictions 107 and 107' therein.

The conduit 104 intermediate the actuators 40 and 40' and the "nand" unit 82 is interconnected to the atmosphere by a controlled bleed means 100 for a purpose hereinafter described. However, the controlled bleed means 100 interconnects the conduit 104 to the atmosphere at a controlled rate that is less than the effective rate of fluid interconnection provided by the restriction 83 in the conduit 77 as will be apparent hereinafter.

The conduit 70 leading from the ignition temperature sensing means 63 is fluidly interconnected to a conduit 106 that is fluidly interconnected to the chamber 61 of the actuator 56.

A remaining port means 108 of the logic "nand" unit 82 is interconnected to the atmosphere through a filter 108' and a port means 109 of the logic "memory" unit 79 is interconnected to the atmosphere.

The remaining port means 110 of the "memory" unit 79 is interconnected by a conduit 110' to the conduit 70 intermediate the restriction 89 and the sensor 63 for a purpose hereinafter described and to the atmosphere through a restriction 100', the conduit 110' having a one-way check valve 88' similar to the check valve 88 whereby like parts are indicated by like reference numerals followed by a prime mark.

As previously stated, the control system 10 is so constructed and arranged that the ignition coil 47 for the burner means 12 must be first energized to a temperature thereof that will be sufficient for igniting fuel issuing from the burner means 12 each time before the actuators 40 and 40' will be actuated to simultaneously move the valve members 39 and 39' from their closed positions to their open positions to cause fuel to issue from the main burner means 12.

Thus, since both temperature sensing devices 63 and 71 are normally disposed in the positions illustrated in FIG. 1 when the control system 10 is initially turned on by the housewife or the like setting the timer cycle means in its "on" position to close the switch blade 25 against the contact 27, the thus energized electric motor 15 will operate the vacuum pump 19 and since the temperature effect of the apparatus 11 is below the temperature effect setting of the thermostatic device 71, the vacuum pump 19 is adapted to evacuate the conduit 69 through the closed housing 75 as well as to evacuate the conduit means 70 and 77 leading respectively to the logic "memory" unit 79 and logic "nand" unit 82.

The logic "nand" unit 82 will now receive a pneumatic signal at the port means 102 thereof from the "memory" unit 79 as well as a pneumatic signal at the port means 85 thereof as long as the valve member 65 of the ignition temperature sensing device 63 is in its open position from the valve seat 68 and is closed against the valve seat 68' whereby the "nand" unit will be in a de-activated condition to prevent the vacuum source 19 from being interconnected to the conduit 104 so that the valve means 14 and 14' remain in their closed positions to prevent fuel from reaching the main burner means 12. However, after the ignition coil 47 reaches its ignition condition, the valve means 65 closes against the valve seat 68 and opens the valve seat 68' so as to terminate the pneumatic signal to the port means 85 of the "nand" unit 82 whereby the "nand" unit 82 will now be activated to a condition thereof to interconnect the vacuum source 19 to the conduit 104 so that the actuators 40 and 40' will be evacuated to open the valve members 39 and 39' so that fuel can issue from the burner means 12 and be ignited by the ignition means 47.

Accordingly, the logic units 79 and 82 always require that the valve member 65 must first be in its open position away from the valve seat 68 and then be moved to a closed position against the valve seat 68 after each closing of the main valve means 14 and 14' before the main valve means 14 and 14' can be again opened, the valve member 65 only closing against the valve seat 68 after an open condition thereof by the ignition coil 47 being energized to a temperature suitable for igniting fuel that is to subsequently issue from the main burner means 12.

The details of the logic units 79 and 82 for accomplishing the above function will now be described in detail whereby reference is now made to FIG. 2.

As illustrated in FIG. 2, the logic units 79 and 82 are substantially identical in construction whereby only the particular details of the logic "memory" unit 79 will now be described and like parts of the logic "nand" unit 82 will be indicated by the same reference numerals followed by the reference letter "A." In this manner, it will be appreciated that the logic units of this invention can be made from the same parts in a simple and effective manner while producing different logic functions as will be apparent hereinafter so that the cost of the control system 10 of this invention is relatively small when considering the costs of prior known electrical and pneumatic control systems.

As illustrated in FIG. 2, the logic "memory" unit 79 comprises two housing parts 111 and 112 suitably secured together to hold two annular members 113 and 114 between the opposed and respective inner end wall means 115 and 116 thereof. A flexible, one-piece diaphragm member 117 is disposed in the housing means 111 and 112 and has an intermediate or large central outwardly directed diaphragm portion 118 provided with an outer peripheral portion 119 that is secured and sealed between the annular members 113 and 114. An outboard smaller spaced diaphragm portion 120 of the diaphragm member 117 has its outer periphery 121 secured and sealed between the housing member 111 and the annular member 113 to define a chamber 122 between the diaphragm portion 120 and the end wall means 115 of the housing member 111 while cooperating with the larger central diaphragm portion 118 to define a chamber 123 between the diaphragm portions 118 and 120. An opposed smaller outboard spaced diaphragm portion 124 of the diaphragm member 117 has its outer periphery 125 secured and sealed between the annular member 114 and the housing member 112 to define a chamber 126 between the diaphragm portion 124 and the end wall means 116 of the housing member 112 while cooperating with the central diaphragm portion 118 to define a chamber 127 between the diaphragm portions 118 and 124.

The diaphragm member 117 has a bore 128 interrupting the end 129 thereof so as to receive a compression spring 130 that has one end bearing against the end wall means 116 of the housing member 112 and the other end thereof bearing against the diaphragm member 117 to normally urge the diaphragm portion 120 against a frustoconical valve seat 131 that projects inwardly from the end wall means 115 of the housing member 111 into the chamber 122. The valve seat means 131 of the logic "memory" unit 79 is interconnected to the port means 78 thereof that leads to the conduit 77 whereas the valve seat means 131A of the "nand" unit 82 is interconnected to the port means 81 that leads to the conduit 80.

The diaphragm member 117 has a passage means 132 passing through the diaphragm portion 120 in offset relation to the valve seat 131 so as to always fluidly interconnect the chambers 122 and 126 together, the passage 132 also being in offset relation to a frustoconical valve seat 133 that projects inwardly from the end wall means 115 of the housing member 112 and is received in the bore 128 of the diaphragm member 117 to be opened and closed by the end wall 134 of the diaphragm member 117 that defines the closed end of the bore 128 and forms part of the effective surface of the diaphragm portion 124 that defines the chamber 126. The valve seat 133 of the logic "memory" unit 79 is interconnected to the port 110 which leads to the conduit 110' and the valve seat 133A of the logic "nand" unit 82 is interconnected to the port means 108 that leads to the atmosphere.

The port means 78 and 99 of the housing member 111 and the port means 110 of the housing member 112 can comprise outwardly extending tubular nipples that can be effectively telescoped into flexible conduit means to fluidly interconnect the same to such conduit means, such nipple extensions containing suitable air filtering means 134'. In the embodiment illustrated in FIG. 2, the nipple port means 99 and 78 of the logic "memory" unit 79 are fluidly interconnected respectively to the conduits 98 and 70 whereas the nipple port means 81 and 103 of the logic "nand" unit 82 are respectively interconnected to the conduits 80 and 104.

The annular member 114 carries the port means 97 in the form of a nipple extension projecting out of an opening means 135 in the housing member 112 and the port means 109 comprises a nipple extension of the annular member 113 projecting out of an opening means 136 of the housing member 111. The nipple port means 97 of the logic "memory" unit 79 is interconnected to the end 96 of the conduit member 95 and the nipple port means 109 is interconnected to the atmosphere whereas the corresponding nipple port means 102 and 85 of the logic "nand" unit 82 are respectively interconnected to the conduits 101 and 70.

Accordingly, it can be seen that the chamber 122 of the logic "memory" unit 79 is always interconnected to the port means 99 and, thus, to the end 98 of the conduit 95 whereas the port means 78 and, thus, the conduit 77 is adapted to be interconnected to the chamber 122 when the diaphragm member 117 opens the valve seat 131. The atmosphere port means 109 is always interconnected to the chamber 123. The chamber 127 is always interconnected by the port means 97 to the end 96 of the conduit means 95. As previously stated, the chamber 126 is always interconnected to the chamber 122 by the passage means 132 and is adapted to be interconnected to the atmosphere or effectively blocked from the atmosphere at the port means 110 except for the controlled rate provided by the bleed restriction 100' when the diaphragm member 117 opens the valve seat 133 depending on whether the valve 88' is open or closed as will be apparent hereinafter.

In regard to the logic "nand" unit 82, the chamber 122A thereof is always interconnected by the port means 103 to the conduit 104 and is adapted to be interconnected to the port means 81 and, thus, to the conduit 80 when the diaphragm member 117A opens the valve seat 131A, the chamber 122A always being interconnected to the chamber 126A by the passage means 132A in the diaphragm member 117A. The chamber 123A is always interconnected by the port means 85 to the conduit 70. The chamber 127A is always interconnected by the port means 102 to the conduit 101. The chamber 126A, while always being interconnected to the chamber 122A by the passage means 132A in the diaphragm member 117A, is adapted to be interconnected to the atmosphere at the port 108 when the diaphragm member 117A opens the valve seat 133A.

The operation of the control system 10 of this invention will now be described.

Assuming that the dryer door is in its closed position to hold the switch blades 29 and 29' in their closed positions, the housewife or the like sets the timer selector means for operating the dryer 11 for a predetermined length of time whereby the timer mechanism closes and holds the switch blade 25 against the contact 27 and will maintain the switch blade 25 against the contact 27 during the entire cycle of operation of the dryer 11 so that at the conclusion of such time period, the timer means will automatically open the blade 25 away from the contact 27 to terminate the operation of the apparatus 11.

With the switch blade 25 now moved to its closed position against the contact 27, it can be seen that the electric motor 15 is placed across the power source leads L¹ and L² so that the electric motor 15 will continuously rotate the laundry receiving drum to tumble the clothes in an atmosphere to be heated by the burner means 12 for drying of the laundry or the like. As the output shaft 17 of the motor 15 is continuously rotating, the same through the eccentric cam 16 reciprocates suitable pumping mechanism of the vacuum pump 19 to continuously provide a vacuum source for the control system 10.

At the initial operation of the control system 10, not only is the ignition coil 47 not at an ignition temperature, but also the temperature effect of the apparatus 11 is below the temperature effect setting of the thermostatic means 71 whereby both valvemembers 65 and 73 are in the position as illustrated in FIG. 1 so that the vacuum source 19 is not only interconnected to the vacuum operated actuator 56 to evacuate the chamber 61 thereof and close the switch blade 52 against the contact 54 to place the ignition coil 47 across the power source leads L¹ and L², but also the vacuum source 19 is interconnected by the conduits 77 and 80 to the valve seats 131 and 131A of the "memory" unit 79 and "nand" unit 82, which valve seats 131 and 131A are normally closed by the diaphragm members 117 and 117A due to the force of the respective compression springs 130 and 130A, and by the conduit means 70 to the chambers 127 and 122 of the "memory" unit 79 and the chamber 123A of the "nand" unit 82. The vacuum in the conduits 70 and 110' causes the check valve 88' to close so that the open valve seat 133 of the "memory" unit 79 is effectively blocked from the atmosphere as the bleed 100' does not effect evacuation of chamber 126.

In particular, since the conduit 70 is interconnected to the inlet 20 of the vacuum pump 19 by the positioned valve members 65 and 73, the vacuum pump 19 can evacuate the chamber 123A of the "nand" unit 82 to maintain the diaphragm member 117A thereof in its de-activated and seating position against the valve seat 131A so that the vacuum source in the conduit 80 leading to the valve seat 131A cannot reach the actuators 40 and 40' to open the valve means 14 and 14'.

Also, since the conduit 86 is now being evacuated, the check valve 88 opens whereas the check valve 88' closes so that the conduit 95 can be evacuated whereby the end 96 thereof evacuates the chamber 127 of the "memory" unit 79 so that the resulting pressure differential acting across the large central diaphragm portion 118 causes the diaphragm member 117 to move upwardly in FIG. 2 in opposition to the force of the compression spring 130 to its activated position to open the valve seat 131.

However, before the evacuation of the chamber 127 of the "memory" unit 79 can effect the switching of the diaphragm member 117 upwardly in FIG. 2, the vacuum source 19 now being interconnected to the chamber 126 by the way of conduit 95, chamber 122 and diaphragm passage 132 to chamber 126, assists in the complete evacuation of the chamber 122 so that when the diaphragm member 117 does switch to its up position in FIG. 2, no atmospheric pressure is permitted to pass out into the conduit 95 and, thus, slow down or prevent the setting of the "memory" unit 79 in its "on" position.

With the valve seat 131 now being opened by the activated "memory" unit 79, the vacuum source 19 is interconnected by the conduit 77 through the restriction means 83 to the chamber 122 of the "memory" unit 79 so that the conduit 101 effectively leading from the chamber 122 of the "memory" unit 79 is evacuated to evacuate the chamber 127A of the "nand" unit 82.

With the chamber 127A of the "nand" unit 82 now being evacuated, it can be seen that as long as the valve member 65 of the ignition temperature sensing means 63 is in its seated position against the valve seat 68', the opposing chamber 123A of the "nand" unit 82 is also evacuated so that an equal vacuum condition exists across the central diaphragm portion 118A of the diaphragm member 117A of the "nand" unit 82 so that the compression spring 130A maintains the diaphragm member 117A in its up or de-activated position in FIG. 2 to maintain the valve seat 131A thereof closed and the chamber 122A thereof that leads to the chambers 45 and 45' of the actuators 40 and 40' of the valve means 14 and 14' interconnected to the atmosphere through the passage means 132A of the diaphragm member 117A and the open valve seat 133A whereby the vAlve members 14 and 14' cannot be opened to interconnect the fuel source 13 to the main burner means 12 as long as a vacuum signal is directed to the chamber 123A by the ignition sensing means 63.

However, when the energized ignition coil 47 subsequently heats up to ignition condition, the sensing member 64 warps downwardly in FIG. 1 to open the valve seat 68' and close the valve member 65 against the valve seat 68 and thereby disconnect the vacuum source 19 from the conduit 70 which begins to return to atmospheric condition by the opened valve seat 68' so that not only is the chamber 61 of the actuator 56 returned to atmospheric condition to open the switch blade 52 away from the contact 54 and de-energize the ignition coil 47, but also the chamber 123A of the "nand" unit 82 returns to atmospheric condition whereby the resulting pressure differential acting across the diaphragm portion 118A of the diaphragm member 117A of the "nand" unit 82 causes the diaphragm member 117A to move downwardly in FIG. 2 in opposition to the force of the compression spring 130A to its activated position to not only open the valve seat 131A to the chamber 122A, but also to close the valve seat 133A from the chamber 126A.

In this manner, since the valve member 73 of the temperature effect sensing means 71 in its open condition, the vacuum source 19, in effect, is interconnected to the chambers 45 and 45' of the actuators 40 and 40' to move the valve members 39 and 39' to their open position so that the fuel source 13 is now interconnected to the main burner means 12 and is ignited by the ignition coil 47.

As previously stated, when the valve member 65 of the ignition temperature sensing means 63 is moved to its closed position against the valve seat 68 to permit the now opened valve seat 68' to return the conduit 70 to atmospheric condition to terminate the vacuum signal to the chamber 123A of the "nand" unit 82 so as to activate the same, the check valve 88 closes so that such return of air into the conduit 70 cannot reach the conduit 94 whereby the diaphragm member 117 of the "memory" unit 79 remains in its actuated condition wherein the valve seat 131 is in its open condition and the valve seat 133 is in its closed condition so that a continuous vacuum signal is directed from the chamber 122 to the chamber 127A of the "nand" unit to maintain the "nand" unit in its activated position for maintaining the valve means 14 and 14' in their open condition, the restriction 83 providing a greater flow than the controlled bleed means 100 in the conduit 104 so that the valve means 14 and 14' remain open. A holding circuit is provided for the "memory" unit from the vacuum source 19 to the chamber 122 of the "memory" unit 79 and by means of the conduit 95 to the chamber 127 to maintain the diaphragm member 117 in its up or activated position. Also, the return of air into the conduit 70 causes the check valve 88' to open whereby atmosphere is at the closed valve seat 133 of unit 79.

Thus, since flames now exist at the main burner means 12, the temperature sensing means 63 will maintain the valve member 65 closed against the valve seat 68 so that the burner means 12 will continue to operate unless the temperature effect being produced by the burner means 12 exceeds the predetermined temperature effect setting of the thermostat means 71.

If the temperature effect of the burner means 12 exceeds the setting of the thermostat 71, the temperature sensing member 72 will move the valve member 73 away from the valve seat 76 to effectively disconnect the conduit 77 from the vacuum source 19 whereby the air will return not only to the chamber 127 of the "memory" unit 79 through the opened valve seat 131 to de-activate the same, but also permit air to return to the chamber 127A of the "nand" unit 82 whereby the compression spring 130A of the "nand" unit 82 will move the diaphragm member 117A upwardly to close the valve seat 131A and open the valve seat 133A so that the chambers 45 and 45' and the actuators 40 and 40' will be interconnected to the atmosphere by the passage means 132A in the diaphragm member 117A leading to the chamber 126A that is interconnected to the open valve seat 123A that leads to the atmosphere at the port 108 as well as by the bleed means 100 in the conduit 104. Similarly, the diaphragm member 117 of the "memory" unit 79 moves downwardly in FIG. 2 under the force of the compression spring 130 because the chamber 127 returns to atmospheric condition so that the valve seat 131 is now closed and the valve seat 133 is opened to return the chamber 126 to atmospheric condition.

Since flames do not now exist at the main burner means 12, the ignition temperature sensing means 63 now causes the valve member 65 to move away from the valve seat 68 and against the valve seat 68' so that when the valve member 73 of the thermostat 71 is again moved to its closed condition against the valve seat 76 by the temperature effect in the dryer 11 falling below the set temperature effect of the thermostat 71, the main burner means 12 will be operated in the manner previously described wherein the igniter means 47 will again be first energized to ignition condition before the valve members 14 and 14' can be opened.

However, if during the normal operation of the control system 10, wherein the main burner means 12 has been interconnected to the fuel source 13 in the manner previously described so as to be continuously burning, the housewife or the like should open the dryer door temporarily to cause the switch blades 29 and 29' to open so as to disconnect the electric motor 15 from the power source leads L¹ and L² whereby the vacuum source 19 ceases to function so that the control system bleeds to atmospheric condition by the controlled bleed 100, and the housewife subsequently closes the dryer door to again activate the motor 15 before the ignition temperature sensing means 63 has moved the valve member 65 away from the valve seat 68, the "nand" unit 82 cannot cause reopening of the valve means 14 and 14' because the "memory" unit 79 has not been reset to its activated position so as to interconnect the conduit 77 to the chamber 122 thereof and, thus, to the chamber 127A of the "nand" unit 82 as it requires an opening of the valve member 65 away from the valve seat 68 of the ignition temperature sensing means 63 to activate the " memory" unit 79 and the "nand" unit 82 requires a subsequent closing of the valve member 65 against the valve seat 68 to terminate the vacuum signal to the chamber 123A thereof before the "nand" unit 82 can be activated to cause opening of the valve means 14 and 14'.

Thus, it can be seen that the control system 10 of this invention utilizes only two logic units each formed of identical structure but performing different logic functions in a manner to control the main burner means 12 so that the system requires that the ignition means 47 be always pneumatically operated to ignition condition before the main burner means 12 can be pneumatically operated to its "on" condition each time there is a requirement to turn on the main burner means.

Further, it can be seen that the logic unit 79 of this invention is so constructed and arranged that during the time of switching the "memory" unit 79, no atmospheric signal is "seen" by the unit 79 to slow down or prevent its switching operation.

Further, any clogging of the restrictions 89 and 83 by dirt or the like during the operation of the system 10 will not cause an adverse situation as the bleed means 100 will cause the valve means 14 and 14' to close and thereby terminate the operation of the burner 12.

The details of the pneumatically operated valve means 14 and 14' of this invention will now be described and reference is now made to FIG. 3 wherein it can be seen that the previously described pneumatically operated valve means 14 and 14' are defined by the same housing means 35 having the inlet 37 and outlet 38 formed therein and separated from each other by the valve seats 36 and 36' in series with the outlet 38 comprising an orifice having a tapering portion 200 and a cylindrical portion 201 to be controlled by the tapering end 202 of a metering pin 203 normally urged to one flow rate position relative to the orifice 38 by a compression spring 204 having one end 205 bearing against a shoulder 206 of the metering pin 203 and the other end 207 bearing against a shoulder means 208 of the housing 35.

The previously described valve members 39 and 39', tying means 44 and 44' and flexible diaphragms 43 and 43' are respectively defined by flexible diaphragms 209 and 209' having their outer peripheries 210 and 210' sealed to annular surfaces 211 and 211' of the housing means 35 by the cup shaped housing members 41 and 41' previously described as the same are fastened to the housing means 35 by suitable fastening means 212 and 212' whereby the cup shaped housing members 41 and 41' cooperate with the flexible diaphragms 209 and 209' to define the previously described chambers 45 and 45' adapted to be respectively disposed in fluid communication with the branch conduits 105 and 105' through suitable opening means in the housing means 35 or cup shaped housing members 41 and 41' as desired. The diaphragms 209 and 209' respectively have thickened central portionS which define valve members 213 and 213' for opening and closing the valve seats 36 and 36', the compression springs 46 and 46' in the chambers 45 and 45' respectively tending to maintain the valve members 213 and 213' against their respective valve seats 36 and 36'.

The housing means 35 has a stepped cylindrical passage 214 leading to the valve seat 36 and being transversely intersected by the inlet 37. Fluid flow through the stepped cylindrical passage 214 to the valve seat 36 is controlled by a pressure regulator generally indicated by the reference numeral 215 throughout the various figures in the drawings and can be of any desired type.

However, the particular pressure regulator 215 illustrated in the drawings is of the type that is fully disclosed and claimed in Ser. No. 643,170, filed June 2, 1967, now U.S. Pat. No. 3,550,623, and Ser. No. 740,150, filed June 26, 1968, such copending applications being assigned to the same assignee to whom this application is assigned and do not form a part of this invention. Therefore, only sufficient details of the pressure regulator structure 215 will now be described in order to fully understand the features of this invention.

Figure 3:
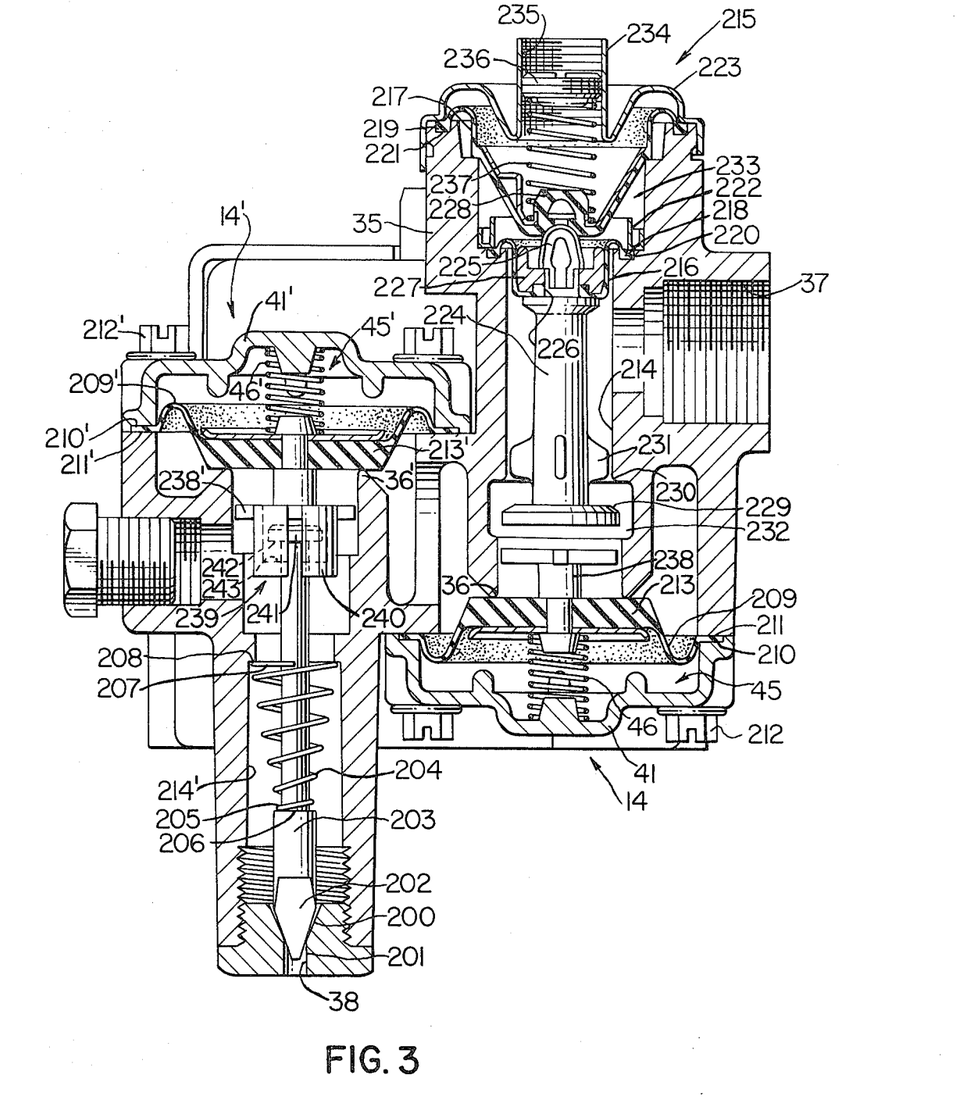
FIG. 3 is a cross-sectional view illustrating the improved pneumatically operated valve means of this invention with the valve means being in a closed position thereof.

As illustrated in FIG. 3, the housing 35 carries a pair of flexible diaphragms 216 and 217 respectively having their outer peripheries 218 and 219 held in annular grooves 220 and 221 of the housing means 35 by metallic retainers 222 and 223, the retainer 223 also forming a closure member. A valve stem 224 has a portion 225 passing through an opening 226 in the flexible diaphragm 216 while being coupled thereto by a seal member 227, the part 225 being interconnected to the medial portion 228 of the flexible diaphragm 217 so as to move in unison therewith. The valve stem 224 carries a valve member 229 at the lower end thereof for cooperating with a valve seat 230 defined by the stepped portion of the cylindrical passage 214, the valve stem 224 having suitable guide fins 231 thereon for guiding movement of the valve stem 224 in the cylindrical passage 214. The valve stem 224 is hollow so as to interconnect the enlarged part 232 of the passage 214 below the valve seat 230 thereof and above the valve seat 36 to a chamber 233 defined between the flexible diaphragms 216 and 217.

The metallic retainer 223 substantially closes off the upper end of the housing 35 and has a tubular portion 234 being internally threaded at 235 to receive a threaded adjusting member 236. A compression spring 237 is disposed between the adjusting member 236 and the diaphragm 217 to tend to urge the diaphragm 217 and, thus, the valve member 229 downwardly in a direction to open the valve seat 230.

In this manner, the setting of the adjusting member 236 and, thus, the force of the compression spring 237 will cause the pressure regulator 215 to maintain the pressure of the fuel passing through the housing 35 from the fuel source 13 to the burner means 12 to be maintained at the pressure setting of the device 236 in the manner fully disclosed in the aforementioned copending patent applications relating to the regulator 215.

In particular, the pressure of the fuel in the part 232 below the valve seat 230 is conveyed to the chamber 233 between the diaphragms 216 and 217 to act against the under side of the diaphragm 217 in opposing the force of the compression spring 237 tending to move the diaphragm 217 downwardly. Thus, when the fuel pressure in the part 232 of the housing 35 exceeds the pressure setting, the same moves the diaphragm 217 upwardly in opposition to the force of the compression spring 237 to decrease the amount of opening of the valve seat 230 whereby the pressure in the outlet portion 232 of the housing 35 drops accordingly. Conversely, if the fuel pressure in the part 232 of the housing falls below the pressure setting of the regulator 215, the force of the pressure in the chamber 233 has decreased so that the compression spring 237 moves the flexible diaphragm 217 downwardly to increase the amount of opening of the valve seat 230 so that the pressure in the part 232 of the housing 35 can be increased.

In order to guide opening and closing movement of the valve members 213 and 213' relative to their respective valve seats 36 and 36', the valve members 213 and 213' carry guide extensions 238 and 238' that project through the valve seats 36 and 36' so as to guide open and closing movement of the valve members 213 and 213' without restricting the flow through the valve seats 36 and 36'.

The guide member 238' of the valve member 213' carries a lost motion means generally indicated by the reference numeral 239 for interconnecting the valve member 213' to the metering pin 203 so as to control movement thereof when the lost motion means 239 is fully taken up in a manner hereinafter described.

In particular, the lost motion means 239 comprises a substantially cup shaped member 240 telescoped over the enlarged upper end 241 of the metering pin 203 so that the under surface 242 of the enlarged head 241 of the metering pin 203 is normally spaced above an annular shoulder means 243 of the cup shaped member 240 when the valve member 213' is disposed in its closed position against the valve seat 36' as illustrated in FIG. 3. However, when the chamber 45' is evacuated by being interconnected to a vacuum source, the diaphragm 209' is pulled upwardly in opposition to the force of the compression spring 46' and the valve member 213' opens relative to the valve seat 36' and will not cause movement of the metering pin 203 relative to the orifice 38 until the shoulder 243 of the lost motion cup member 240 abuts against the under surface 242 of the enlarged head 241 of the metering pin 203 to move the same upwardly relative to the orifice 38 in opposition to the force of the compression spring 204 as illustrated in FIG. 4 whereby when the diaphragm 209' is disposed in the full up position thereof as illustrated in FIG. 4, the metering pin 203 is now provided a greater fuel flow rate through the orifice 38 than when in the normal position illustrated in FIG. 3.

Figure 4:
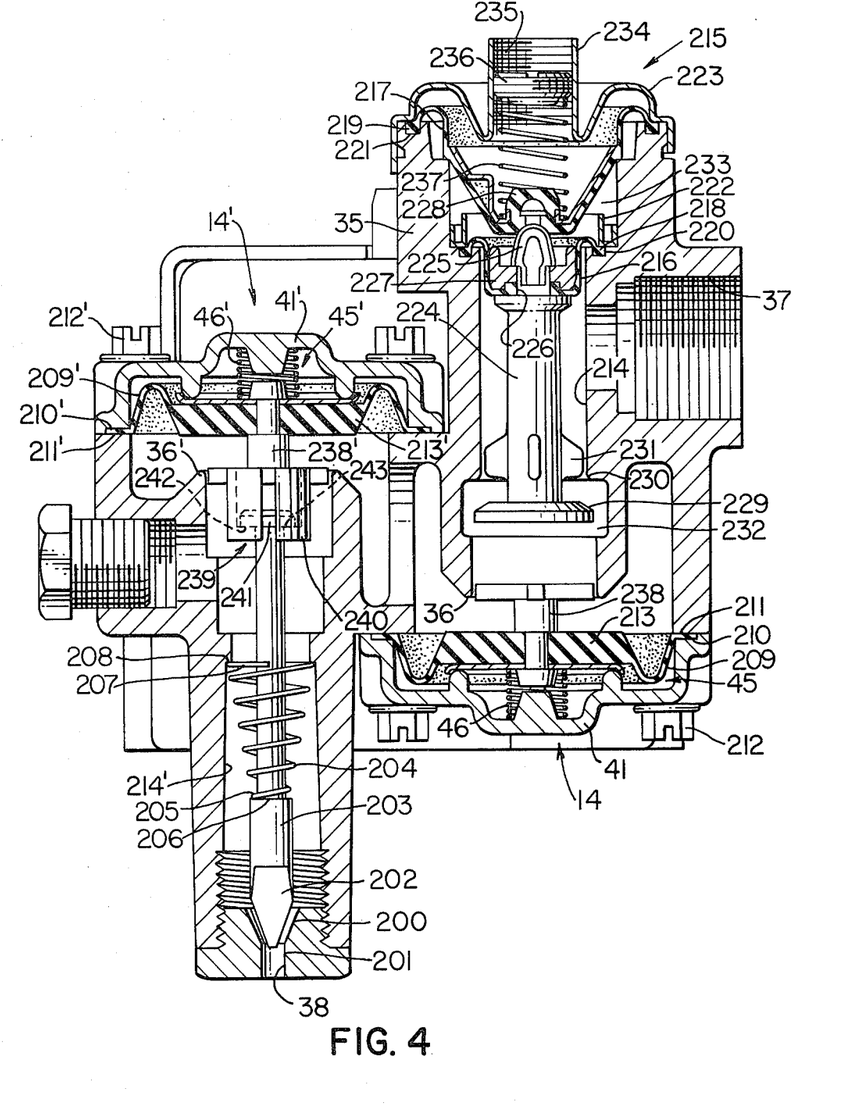
FIG. 4 is a view similar to FIG. 3 and illustrates the pneumatically operated valve means in a fully open position thereof.

Accordingly, upon the opening of the valve member 213', if the same is only opened relative to the valve seat 36' a distance sufficient to prevent movement of the metering pin 203 from the position illustrated in FIG. 3 to the position illustrated in FIG. 4, the pneumatically operated valve means 14 and 14' of this invention will provide fuel flow to the burner means 12 at the flow rate level provided by the metering pin 203 in its position as illustrated in FIG. 3. However, if the vacuum level being interconnected to the chamber 45' is increased so as to cause the diaphragm 209' to further move upwardly to the position illustrated in FIG. 4 and carry the metering pin 203 therewith to the position illustrated in FIG. 4, an increased fuel flow level will be provided by the valve means 14 and 14' of this invention for the burner means 12.

Accordingly, the branch conduit 105' as illustrated in FIGS. 1 and 2 can have a selector means 244 therein for controlling the degree of vacuum being directed to the chamber 45' so that at one setting of the selector 244, the interconnection of the vacuum source to the chamber 45' by the control system 10 in the manner previously described will only cause the diaphragm 209' to move to an intermediate position thereof for opening the valve seat 36' without causing movement of the meterinG pin 203 from the position illustrated in FIG. 3. The other setting of the selector means 244 will permit full vacuum to be interconnected to the chamber 45' so that the diaphragm 209' will move the position illustrated in FIG. 4 for providing a high flow rate to the burner means 12.

Therefore, it can be seen that when the control system 10 interconnects the vacuum source to the branch conduits 105 and 105' in the manner previously described, the diaphragms 209 and 209' cause the valve members 213 and 213' to open away respectively from the valve seats 36 and 36' so that the fuel source 13 can be interconnected to the burner means 12 and can have the pressure thereof regulated by the pressure regulator 215 whereby not only are improved pneumatically operated valve means provided by this invention, but also an improved pneumatic control system utilizing such pneumatically operated valve means is provided by this invention.

While the pneumatically operated valve means 14 and 14' of FIGS. 3 and 4 have been described as having the valve member 213' thereof moved to different positions by having the pneumatic source level directed thereto provided by two different settings to provide high and low flame fuel flows to the burner means 12, another valve means of this invention can be utilized for providing such two fuel flow levels by utilizing the same vacuum source in a selective manner.

Figure 5:
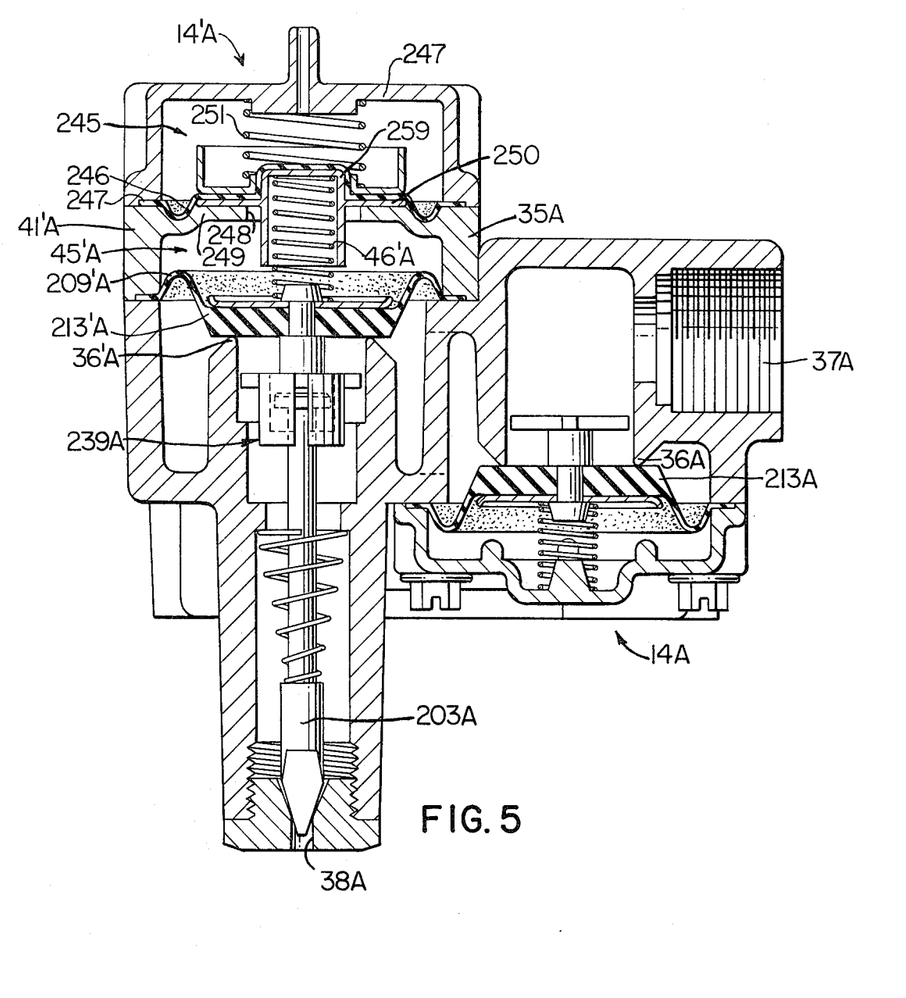
FIG. 5 is a view similar to FIG. 3 and illustrates another embodiment of the pneumatically operated valve means of this invention.

Accordingly, reference is now made to FIG. 5 wherein another housing means 35A of this invention carrying two pneumatically operated valve means 14A and 14'A is provided whereby parts similar to the pneumatically operated valve means 14 and 14' previously described and illustrated are indicated by like reference numerals followed by the reference letter "A."

As illustrated in FIG. 5, the housing means 35A is not provided with a pressure regulator 215 between the inlet 37A thereof and the valve seat 36A but the same could be provided with such a pressure regulator 215, if desired. The valve members 213A and 213'A as well as the metering pin 203A are identical in their operation and structure previously described except that the housing means 35A is so constructed and arranged that the same defines not only the chamber 45'A for the flexible diaphragm 209'A, but also defines another chamber 245 separated from the chamber 45'A by a flexible diaphragm 246 having its outer periphery 247 disposed between the cup shaped housing member 41'A and another cup shaped housing member 247 while spanning an opening 248 in the closed end wall 249 of the first cup shaped housing member 41'A. A spring retainer 259 is substantially cup shaped and is disposed in the opening 248 while having an outer annular flange 250 thereof disposed between the flexible diaphragm 246 and the end wall 259 of the cup shaped housing member 41'A, the cup shaped spring retainer 259 receiving the compression spring 46'A therein which normally tends to urge the valve member 213'A against the valve seat 36'A as illustrated in FIG. 5. The flexible diaphragm 246 is normally urged to the position illustrated in FIG. 5 by a compression spring 251 disposed in the chamber 245.

Thus, when the vacuum source is only interconnected to the chamber 45'A in the manner previously described, the flexible diaphragm 209'A moves upwardly and bottoms out against the spring retainer 259 before such opening movement of the valve member 213'A will cause upward movement of the metering pin 203A. Thus, by merely interconnecting the vacuum source to the chamber 45'A, the valve seat 36'A will be fully opened but the metering pin 203A will merely provide a low fuel flow rate to the burner means 12 as the same remains in the position illustrated in FIG. 5. If it is desired to provide a higher fuel flow rate through the orifice 38A, the vacuum source is additionally interconnected to the chamber 245 whereby the flexible diaphragm 246 is moved upwardly in opposition to the force of the compression spring 251 whereby the spring retainer 259 also moves upwardly therewith and permits the flexible diaphragm 209'A to further move upwardly to another open position thereof whereby the lost motion means 239A has been taken up and the metering pin 203A is moved upwardly with the valve member 213'A to a new position thereof for providing a high fuel flow rate to the burner means in a manner similar to the metering pin 203 previously described.

Therefore, it can be seen that this invention not only provides an improved pneumatically operated valve means for fuel burning apparatus or the like, but also this invention provides improved fuel control systems utilizing such pneumatically operated valve means.

While the form of this invention now preferred has been described as required by the statutes, other forms may be used all coming within the scope of the claims which follow.

What is claimed is:

1. A pneumatically operated valve meanS comprising a housing means having an inlet separated from an outlet by a valve seat, said outlet having an orifice through which the entire flow from said inlet must pass when said valve seat is opened, a pneumatically operated valve member being carried by said housing means for opening and closing said valve seat, and a metering pin having one end cooperating with said orifice for controlling flow therethrough and being interconnected to said valve member so that said valve member and said metering pin are removable as a self-contained unit from said housing means, said metering pin being interconnected to said valve member by lost motion means whereby said valve member can move to at least one open position thereof without causing movement of said metering pin relative to said orifice.

2. A pneumatically operated valve means as set forth in claim 1 wherein said lost motion means causes said metering pin to move relative to said orifice when said valve member moves to another open position thereof.

3. A pneumatically operated valve means as set forth in claim 2 wherein said pneumatically operated valve member defines chamber means with said housing means whereby said chamber means is adapted to be interconnected to a pneumatic source means for operating said valve member.

4. A pneumatically operated valve means as set forth in claim 1 wherein said valve member is adapted to provide two levels of flow through said orifice by positioning said metering pin in accordance with movement of said valve member.

5. A pneumatically operated valve means as set fOrth in claim 1 wherein another pneumatically operated valve member is carried by said housing means for controlling a valve seat disposed between said first-named valve seat and said inlet.

6. A pneumatically operated valve means as set forth in claim 5 wherein a pressure regulator is carried by said housing means for controlling the degree of pressure of the fluid passing through said housing means at a point in advance of said other valve seat.

7. A pneumatically operated valve means comprising a housing means having an inlet separated from an outlet by a valve seat, said outlet having an orifice through which the entire flow from said inlet must pass when said valve seat is opened, a pneumatically operated valve member being carried by said housing means for opening and closing said valve seat, and a metering pin having one end cooperating with said orifice for controlling flow therethrough and being operatively interconnected to said valve member, said metering pin being interconnected to said valve member by lost motion means whereby said valve member can move to at least one open position thereof without causing movement of said metering pin relative to said orifice, said lost motion means causing said metering pin to move relative to said orifice when said valve member moves to another open position thereof, said pneumatically operated valve member defining chamber means with said housing means whereby said chamber means is adapted to be interconnected to a pneumatic source means for operating said valve member, said chamber means being adapted to cause said valve member to move to said one open position thereof when said pneumatic source means is at one level thereof and being adapted to cause said valve member to move to said other open position thereof when said pneumatic source means is at another level thereof.

8. A pneumatically operated valve means comprising a housing means having an inlet separated from an outlet by a valve seat, said outlet having an orifice through which the entire flow from said inlet must pass when said valve seat is opened, a pneumatically operated valve member being carried by said housing means for opening and closing said valve seat, and a metering pin having one end cooperating with said orifice for controlling flow therethrough and being operatively interconnected to said valve member, said metering pin being interconnected to said valve member by lost motion means whereby said valve member can move to at least one open position thereof without causing movement of said metering pin relative to said orifice, said lost motion means causing said metering pin to move relative to said orifice when said valve member moves to another open position thereof, said pneumatically operated valve member defining chamber means with said housing means whereby said chamber means is adapted to be interconnected to a pneumatic source means for operating said valve member, said chamber means comprising two chambers, one of said chambers being adapted to cause said valve member to move to said one open position thereof when said pneumatic source means is interconnected to only that one chamber whereas said chambers are adapted to cause said valve member to move to said other open position thereof when said pneumatic source means is interconnected to both chambers.

9. A pneumatically operated valve means as set forth in claim 8 wherein a flexible diaphragm is carried by said housing means and separates said two chambers from each other, a spring retainer cooperating with said diaphragm to move in unison therewith, and spring means disposed between said retainer and said valve member to tend to move said valve member in one direction relative to said valve seat.

10. In a fuel control system having a source of fuel, a burner means and a pneumatic source means, the improvement comprising a pneumatically operated valve means having a housing means provided with an inlet separated from an outlet by a valve seat, means interconnecting said fuel source to said inlet, means interconnecting said burner means to said outlet, said outlet having an orifice through which the entire fuel flow from said inlet must pass when said valve seat is opened, a pneumatically operated valve member being carried by said housing means for opening and closing said valve seat, and a metering pin having one end cooperating with said orifice for controlling fuel flow therethrough and being interconnected to said valve member so that said valve member and said metering pin are removable as a self-contained unit from said housing means, said metering pin being interconnected to said valve member by lost motion means whereby said valve member can move to at least one open position thereof without causing movement of said metering pin relative to said oriface.

11. In a fuel control system as set forth in claim 10, the further improvement wherein said lost motion means causes said metering pin to move relative to said orifice when said valve member moves to another open position thereof.

12. In a fuel control system as set forth in claim 10, the further improvement wherein said valve member is adapted to provide two levels of fuel flow through said orifice by positioning said metering pin in accordance with movement of said valve member.

13. In a fuel control system as set forth in claim 10, the further improvement wherein another pneumatically operated valve member is carried by said housing means for controlling a valve seat disposed between said first-named valve seat and said inlet.

14. In a fuel control system as set forth in claim 13, the further improvement wherein a pressure regulator is carried by said housing means for controlling the degree of pressure of the fuel passing through said housing means at a point in advance of said other valve seat.

15. In a fuel control system having a source of fuel, a burner means and a pneumatic source means, the improvement comprising a pneumatically operated valve means having a housing means provided with an inlet separated from an outlet by a valve seat, means interconnecting said fuel source to said inlet, means interconnecting said burner means to said outlet, said outlet having an orifice through which the entire fuel flow from said inlet must pass when said valve seat is opened, a pneumatically operated valve member being carried by said housing means for opening and closing said valve seat, and a metering pin having one end cooperating with said orifice for controlling fuel flow therethrough and being operatively interconnected to said valve member, said metering pin being interconnected to said valve member by lost motion means whereby said valve member can move to at least one open position thereof without causing movement of said metering pin relative to said orifice, said lost motion means causing said metering pin to move relative to said orifice when said valve member moves to another open position thereof, said pneumatically operated valve member defining chamber means with said housing means whereby said chamber means is adapted to be interconnected to said pneumatic source means for operating said valve member.

16. In a fuel control system having a source of fuel, a burner means and a pneumatic source means, the improvement comprising a pneumatically operated valve means having a housing means provided with an inlet separated from an outlet by a valve seat, means interconnecting said fuel source to said inlet, means interconnecting said fuel source to said inlet, means interconnecting said burner means to said outlet, said outlet having an orifice through which the entire fuel flow from said inlet must pass when said valve seat is opened, a pneumatically operated valve member being carried by said housing means for opening and closing said valve seat, and a metering pin having one end cooperating with said orifice for controlling fuel flow therethrough and being operatively interconnected to said valve member, said metering pin being interconnected to said valve member by lost motion means whereby said valve member can move to at least one open position thereof without causing movement of said metering pin relative to said orifice, said lost motion means causing said metering pin to move relative to said orifice when said valve member moves to another open position thereof, said pneumatically operated valve member defining chamber means with said housing means whereby said chamber means is adapted to be interconnected to said pneumatic source means for operating said valve member, said chamber means being adapted to cause said valve member to move to said one open position thereof when said pneumatic source means is at one level thereof and being adapted to cause said valve member to move to said other open position thereof when said pneumatic source means is at another level thereof.

17. In a fuel control system having a source of fuel, a burner means and a pneumatic source means, the improvement comprising a pneumatically operated valve means having a housing means provided with an inlet separated from an outlet by a valve seat, means interconnecting said burner means to said outlet, said outlet having an orifice through which the entire fuel flow from said inlet must pass when said valve seat is opened, a pneumatically operated valve member being carried by said housing means for opening and closing said valve seat, and a metering pin having one end cooperating with said orifice for controlling fuel flow therethrough and being operatively interconnected to said valve member, said metering pin being interconnected to said valve member by lost motion means whereby said valve member can move to at least one open position thereof without causing movement of said metering pin relative to said orifice, said lost motion means causing said metering pin to move relative to said orifice when said valve member moves to another open position thereof, said pneumatically operated valve member defining chamber means with said housing means whereby said chamber means is adapted to be interconnected to said pneumatic source means for operating said valve member, said chamber means comprising two chambers, one of said chambers being adapted to cause said valve member to move to said one open position thereof when said pneumatic source means is interconnected to only that one chamber whereas said chambers are adapted to cause said valve member to move to said other open position thereof when said pneumatic source means is interconnected to both chambers.

18. In a fuel control system as set forth in claim 17, the further improvement wherein a flexible diaphragm is carried by said housing means and separates said two chambers from each other, a spring retainer cooperating with said diaphragm to move in unison therewith, and spring means disposed between said retainer and said valve member to tend to move said valve member in one direction relative to said valve seat.

* * * * *